De L. KENNEDY.
Hay Spreader.

No. 80,412.

Patented July 28, 1868.

United States Patent Office.

DE LANCY KENNEDY, OF NEW YORK, N. Y.

Letters Patent No. 80,412, dated July 28, 1868.

---

IMPROVEMENT IN HAY-SPREADERS.

---

The Schedule referred to in these Letters Patent and making part of the same.

---

TO ALL WHOM IT MAY CONCERN:

Be it known that I, DE LANCY KENNEDY, of the city, county, and State of New York, have invented a new and improved Fork for Hay-Tedders; and I do hereby declare that the following is a full, clear, and exact description of the same, reference being had to the accompanying drawings, forming a part of this specification, in which—

Similar letters of reference indicate corresponding parts in the several figures.

This invention consists, first, in providing the bars of the forks of hay-tedders with adjustable journal-boxes, whereby their effective length may be increased or diminished, so that the same may be worked nearer to or further from the ground, as may be desired; and it consists secondly, in a novel means of securing the tines, whereby they may be more conveniently and effectually attached and removed.

In order that others may be better enabled to understand the construction and operation of my invention, I will proceed to describe it with reference to the drawings.

A is the bar of a hay-tedder fork, of substantially the same construction of those in general use. B is an adjustable journal-box, secured to the under side of the bar, and arranged to slide up and down by means of longitudinal slots, $ff$, cut in the flanges thereof, through which pass bolts, $e\ e$, which extend upward through the bar, and are secured by nuts on the upper ends thereof.

To lengthen or shorten the fork, the nuts upon the ends of the said bolts $e\ e$ have only to be loosened, whereupon the box B may be easily moved up or down upon the bar, making the fork longer or shorter, as is desirable, after which a readjustment of the nuts upon the bolts $e$ will secure the box B in said location.

Figure 1:
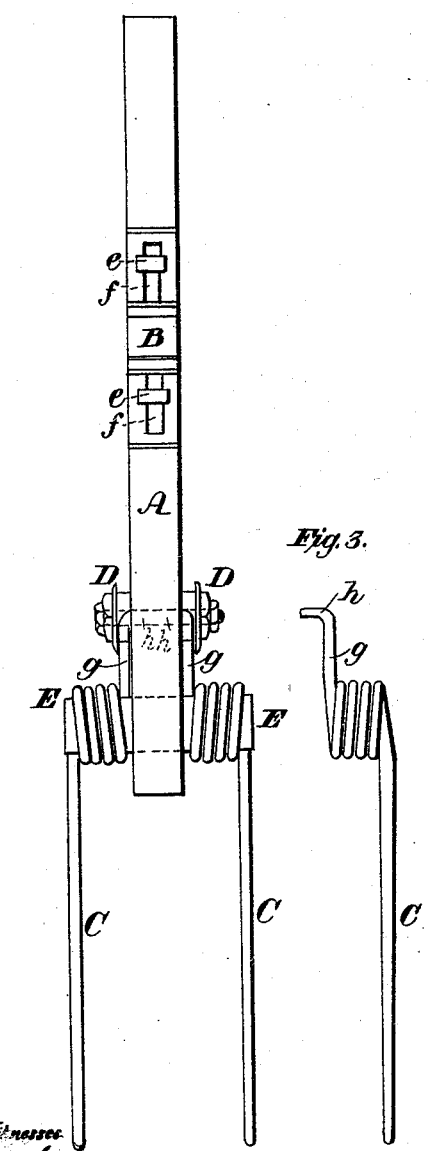
Figure 1 represents a back view of a tedder-fork, illustrating my improvements.
Figure 2:
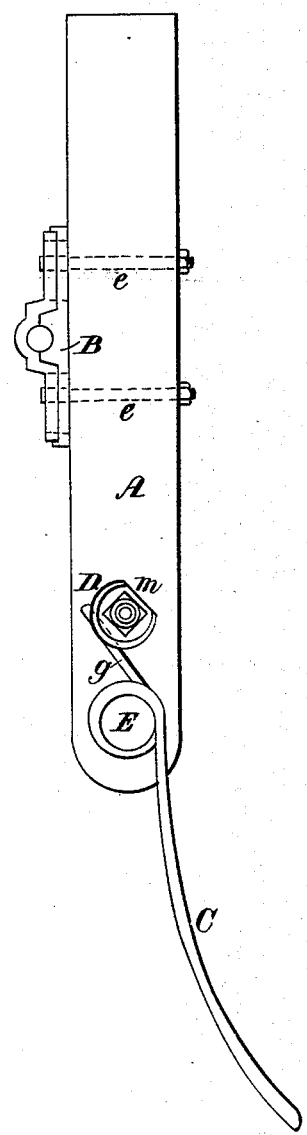
Figure 2 represents a side view of the same.
Figure 3:
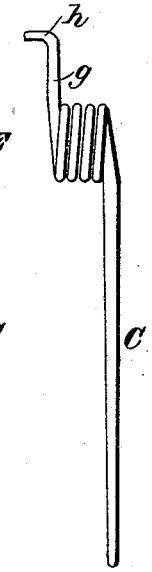
Figure 3 represents the tine removed from the bar.

C C are the tines of the fork, the upper parts of which are coiled in a well-known manner to fit the ends of a transverse stud, F, in the lower end of the bar A, but, instead of being fixedly attached thereto, they have their terminal portions extended beyond the coils, in an upward direction, a short distance, as shown at $g$, where their extremities, by being bent at right angles, as shown at $h$, in figs. 1 and 3, are enabled to enter holes provided therefor in the bar A, and are therein retained by overlapping flanges upon buttons, D D, which are secured upon each side of the arm A by a bolt passing through them and the bar.

By means of a nut upon the end of said bolt the buttons D may be tightened or loosened at pleasure. These buttons D D have a portion of their flanges removed, as shown at M, so that there is one position to which if they are turned they will not retain the tines on account of the removal of said portion of the flanges, and when it is desirable to remove one or both of the tines for insertion of new ones, or for any other purpose, the same may be effected by first loosening the nut upon the bolt which secures the said buttons D D, and the said buttons turned until that portion thereof upon which there is no flange comes opposite the tine, whereupon the tine may be easily removed and replaced, or have a new one substituted for it, after which the said button may be again turned so as to bring its flange-portion in a position to cover and retain the same, and the nut again tightened upon the bolt.

Instead of the bolt having a head at one end and a screw and nut on the other, it may have a screw and nut at each end.

What I claim as my invention, and desire to have secured by Letters Patent, is—

1. An adjustable journal-box B, in combination with the fork of a hay-tedder, whereby the said fork may be set to operate nearer to or further from the ground, substantially as herein described.

2. The buttons D D, in combination with the extended and bent portions of the tines C C, substantially as and for the purpose herein set forth.

DE LANCY KENNEDY.

Witnesses:
A. LE CLERC,
A. KINNIER.